US005695705A

United States Patent [19]

Halket et al.

[11] Patent Number: 5,695,705

[45] Date of Patent: Dec. 9, 1997

[54] METHOD FOR MAKING TAPE CUTTING APPARATUS

[75] Inventors: Andrew Richard Halket, Cambridge; Charles Robert Sims, Royston, both of United Kingdom

[73] Assignee: Esselte N.V., St. Niklaas, Belgium

[21] Appl. No.: 703,841

[22] Filed: Aug. 27, 1996

Related U.S. Application Data

[63] Continuation of Ser. No. 180,242, Jan. 11, 1994, abandoned.

[30] Foreign Application Priority Data

Jan. 13, 1993 [GB] United Kingdom .................... 9300579

[51] Int. Cl.[6] ............................ B29C 45/14; B29C 33/12

[52] U.S. Cl. ........................... 264/277; 264/273; 264/278

[58] Field of Search ..................................... 264/250, 259, 264/275, 278, 279.1, 293, 294, 328.1, 271.1; 425/130, 129.1

[56] References Cited

U.S. PATENT DOCUMENTS 4,715,122 12/1987 Linden ...................................... 30/254

FOREIGN PATENT DOCUMENTS

| | | |
|---|---|---|
| 0 319 209 A3 | 6/1989 | European Pat. Off. . |
| 0 468 900 A1 | 7/1990 | European Pat. Off. . |
| 0 478 246 A1 | 4/1991 | European Pat. Off. . |
| 0 462 807 A1 | 12/1991 | European Pat. Off. . |
| 0 488 998 A2 | 6/1992 | European Pat. Off. . |
| 1 428 365 | 3/1976 | United Kingdom . |
| 1165971 | 10/1996 | United Kingdom . |
| WO 89/04746 | 11/1987 | WIPO . |

*Primary Examiner*—Angela Y. Ortiz

*Attorney, Agent, or Firm*—Pennie & Edmonds LLP

[57] ABSTRACT

There is described a blade assembly particularly for performing a tab cut in a label. The blade assembly comprises a blade received in an injection moulded plastics holder. The holder has shoulders on either side of the blade to assist in locating it and spacing it from a label to be cut. During manufacture, the blade is located within the mould for accurate injection moulding.

15 Claims, 6 Drawing Sheets

FIG. 4a
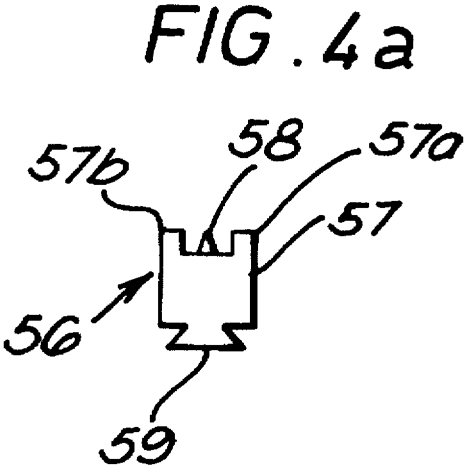
FIG. 4b
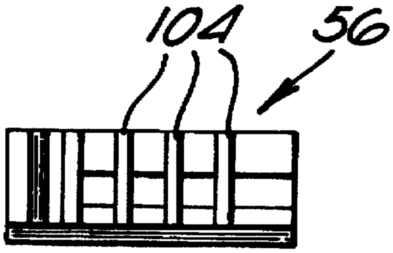
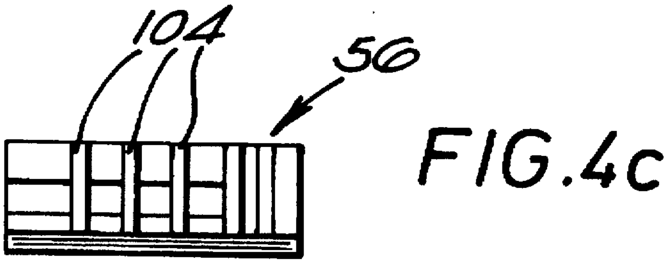
FIG. 4c
FIG. 4d
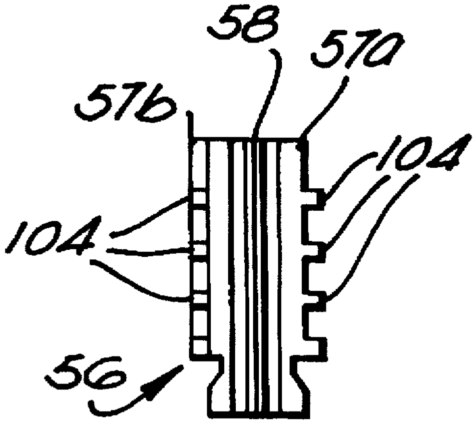
FIG. 4e
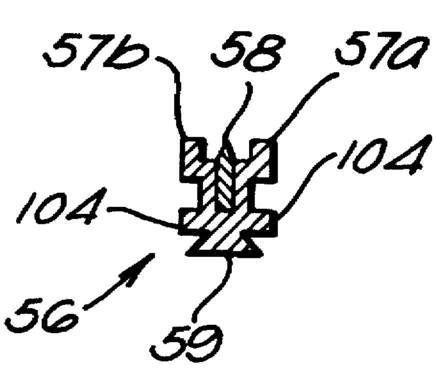

METHOD FOR MAKING TAPE CUTTING APPARATUS

This is a continuation of application Ser. No. 08/180,242, filed Jan. 11, 1994, now abandoned.

FIELD OF THE INVENTION

This invention relates to a tape cutting apparatus and is particularly concerned with cutting tape in printing devices.

BACKGROUND TO THE INVENTION

Thermal printing devices of the general type with which the present invention is particularly but not exclusively concerned are known. They operate with a supply of tape arranged to receive an image and a means for transferring an image onto the tape. In one known device, a tape holding case holds a supply of image receiving tape and a supply of an image transfer ribbon, the image receiving tape and the transfer ribbon being passed in overlap through a printing zone of the printing device. At the print zone, a thermal print head cooperates with a platen to transfer an image from the transfer ribbon to the tape. A printing device operating with a tape holding case of this type is described for example in EP-A-0267890 (Varitronics, Inc.). Other printing devices have been made in which letters are transferred to an image receiving tape by a dry lettering or dry film impression process. In all of these printing devices, the construction of the image receiving tape is substantially the same. That is, it comprises an upper layer for receiving an image which is secured to a releaseable backing layer by a layer of adhesive.

Once an image or message has been printed on the tape, it is desired to cut off that portion of the tape to enable it to be used as a label. For this purpose, it is necessary to remove the releaseable backing layer from the upper layer to enable the upper layer to be secured to a surface by means of the adhesive layer. With existing printing devices, it is difficult to remove the releaseable backing layer from the upper layer: it is necessary first to separate the closely adhered end portions of the releaseable backing layer and the upper layer, for example using a fingernail or tweezers so that the separated end portion of the releaseable backing layer can be finger gripped to peel it off the adhesive layer. This is a relatively difficult procedure and furthermore can result in the ends of the label being damaged in the process.

There have been several attempts to solve this problem. One approach is to provide a so-called tab cut. In these devices, a first cut is made completely through all the layers of the tape to cut off a portion of the tape and at the same time a cut is made through only one layer of the tape. This provides a "tab" which, in theory, can be peeled away reasonably easily. In embossing label makers a system is known whereby a sharp steel blade is used to cut the plastic label against a soft, serrated anvil, such that the soft plastic backing layer remains substantially intact. Such a system does not work satisfactorily with electronic label makers as the backing layer used is normally paper and the plastic label tape is thinner than normal embossing tape. Any attempt to use a similar approach in an electronic label printer would require high cutting forces and frequent replacement of the soft cutting anvil. Although there have been several proposals, no such tab cut has successfully been implemented in a thermal printing device. By way of example, reference is made to EP-A-0319209 which describes one attempt to form a tab cut system. In EP-A-319209, the tab cut is made only through the thickness of the backing layer which is applied as a release layer of double-sided adhesive tape.

In that system, two blades are provided on a cutter support, the blades having different heights so that they penetrate the backing layer to different extents. In this way, one blade cuts through all the layers of the tape at one location while the other blade cuts only through the releaseable backing layer.

One problem which arises with the tab cutting apparatus described in EP-A-0319209 is the control of the height of the blades to ensure that there is reliability in that one blade always cuts through the whole tape and the other blade only cuts through the backing layer. This is difficult to achieve where tapes of differing thicknesses are provided for use with the cutting apparatus. A variation in thickness such that could arise due to normal manufacturing tolerances could even give rise to problems in this respect.

Another difficulty is that the tab cut depends on making two cuts simultaneously from the common cutter support, requiring increased force to be applied by the user. The force is applied manually and the force applied by some users may be insufficient to provide a proper tab cut, causing the label to be damaged when the backing is removed. Conversely too great a force may cause both tapes to be fully cut in both positions, leaving a portion of material within the cutting mechanism.

These problems have meant that to date the above described system has not been successfully implemented.

In this regard reference is made to British Patent Application No. 9212423.9 in the name of the present applicant which describes a tape cutting apparatus in which a tab cut is implemented using a drive means to provide the force for the tab cutting blade. The contents of that Application are incorporated herein by reference.

A particularly important aspect to providing a successful implementation of a tab cut is to enable the depth of cut to be controlled carefully. Only in this way can a reliable tab cut be produced which cuts only through one layer of the multilayer tape leaving the remaining layers intact.

SUMMARY OF THE INVENTION

According to the present invention in one aspect there is provided a blade assembly which comprises an injection moulded plastics holder receiving a cutting blade, the holder having supporting surfaces which extend beyond a surface of the holder from which the blade protrudes and which hold the tape and prevent the blade from piercing all the layers of a multilayer tape.

The tab cutting assembly is made by providing a mould, locating the cutting blade within the mould, injecting plastic material into the mould, and allowing the plastics material to set. The location of the cutting blade is done so that a very close tolerance can be achieved on the blade height of the order of 20 to 25 μm. Typically 100 to 120 microns of blade height is required for cutting through a 75 micron polyester tape with a total thickness of 135 microns including adhesive backing paper. The lower limit would be 95 μm instead of 100 μm. For polyester tape of a different thickness a different blade height would be required. Preferably the blade height is 20 to 45 μm greater than the thickness of the polyester tape.

According to another aspect of the invention there is provided a tape cutting apparatus comprising:

- locating a cutting blade within a mould using at least one biased pin member, a cutting portion of the blade protruding from said mould;
- injecting plastics material into the mould, and allowing the plastics material to set to form an injection moulded plastics holder around said blade with an amount of the blade protruding from the holder which is less than the height of the holder; and removing said injection moulded plastics holder from said mould.

This method aids in achieving the required close tolerance for the protruding blade height.

Preferably the cutting blade is made from a ceramic material since this typically requires as low as a half to one third the force of a steel blade for the same cut. In fact, it has been discovered that with the thin polyester material used as the image receiving tape, the blade does not actually cut the material in the normal sense of the word but rather cracks it. A ceramic blade is ideal for this.

Preferably, the tab cutting assembly forms part of a tape cutting apparatus which further includes a second cutting means which is operable to cut through all of the layers of said multilayer tape. In the described embodiment, the second cutting means is actuated by the same drive means as the tab cut blade so that a portion of tape can be cut off while a cut is also made through only one layer of the tape at a position spaced apart from the cut off edge. This enables labels with tabs to be produced.

The second cutting means can comprise two blades cooperable to form a scissor cut, for example in which one of the blades is fixed while the other of the blades is arranged to move towards the fixed blade when actuated by the drive means.

The holder of the tab cut assembly is preferably resiliently mounted and acts against an anvil which can form part of the tape cutting apparatus or can be provided as part of a thermal printing device with which the tape cutting apparatus is to cooperate.

Where both the tab cut assembly and the second cutting means are arranged to be driven from the common drive means, means can be provided for disconnecting the second cutting means while the tab cut assembly remains driven thereby. In this way, it is possible for a thermal printing device to produce a continuous strip of labels, separated one from another by a cut but being secured to a common backing layer.

For a better understanding of the present invention, and to show how the same may be carried into effect, reference will now be made by way of example, to the accompanying drawings.

Figure 9:
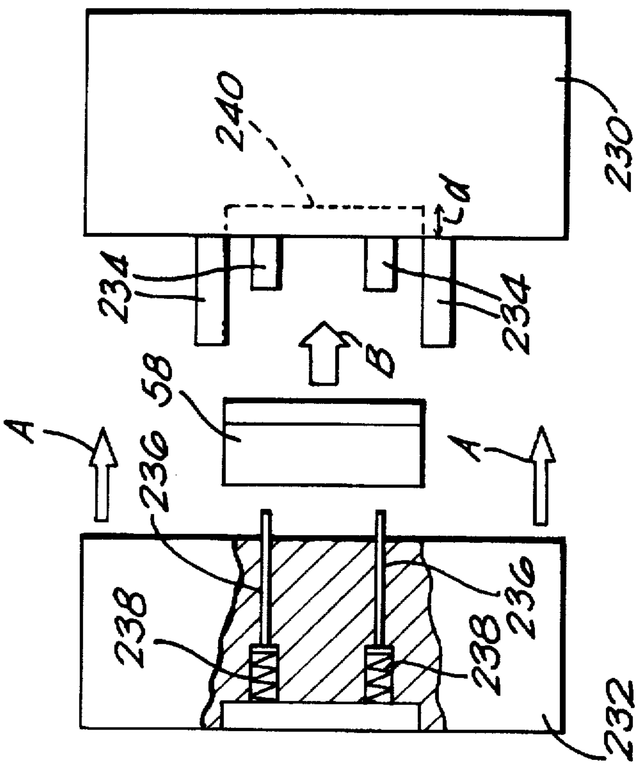
Figure 5:
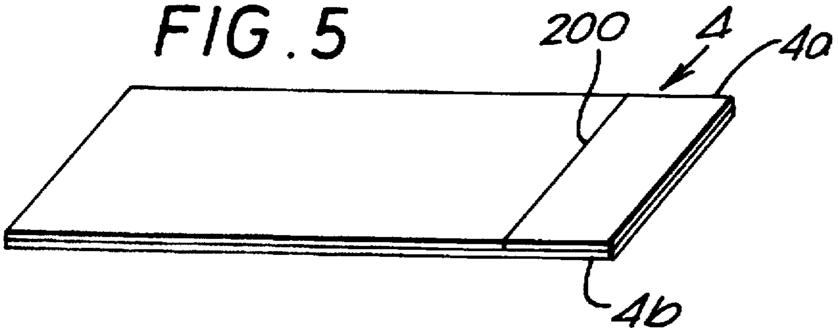
Figure 8:
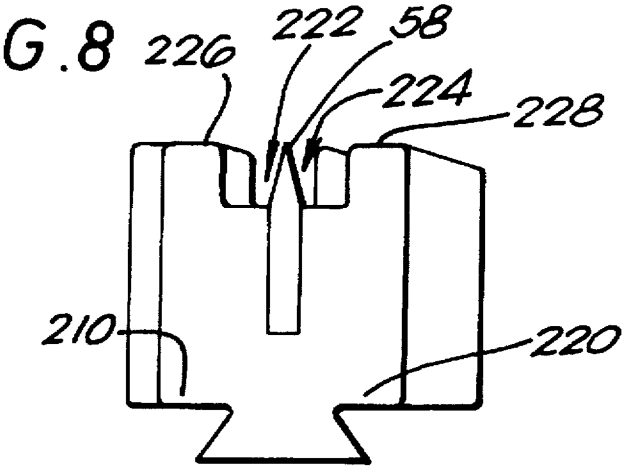
Figure 10:
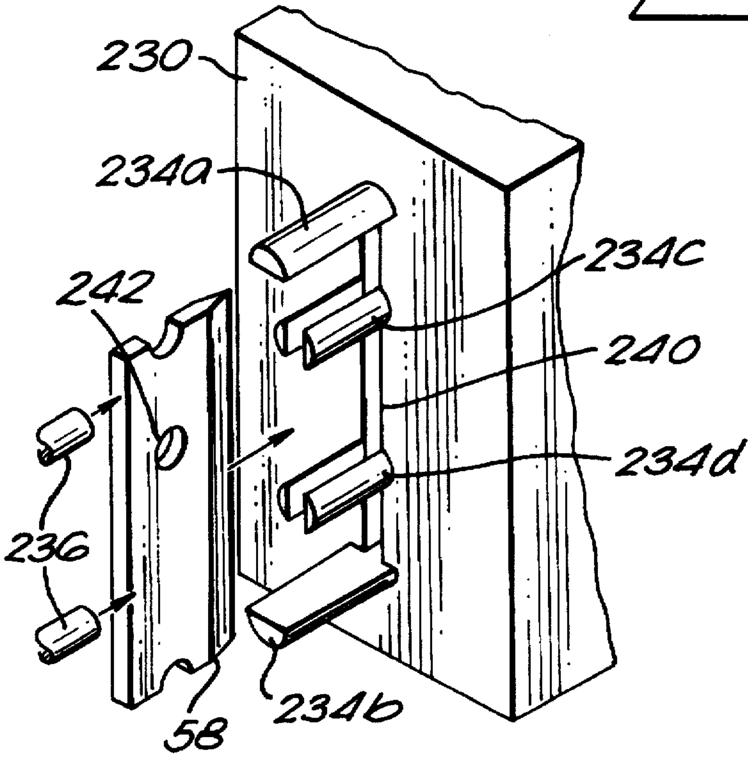
Figure 6:
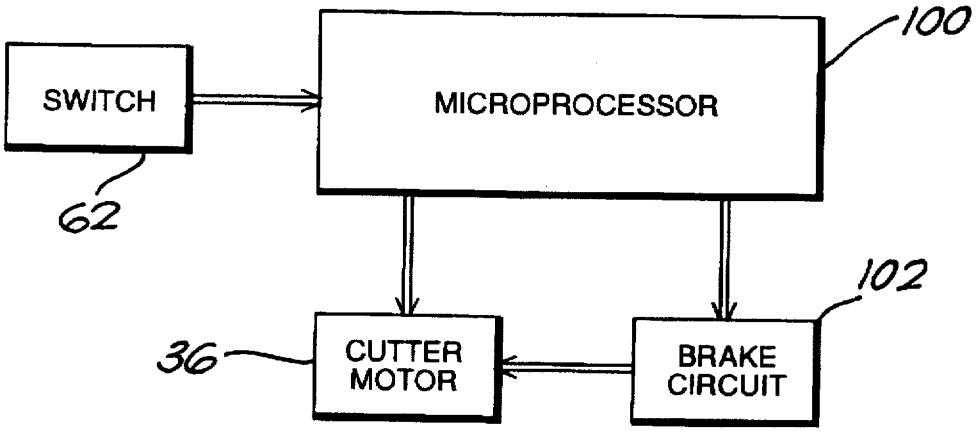
Figure 7A:
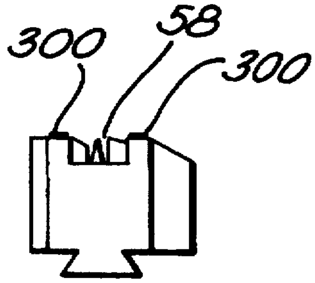

FIG. **4*a*** is an end view of a tab cut assembly;

FIG. **4*b*** is a side view of the tab cut assembly;

FIG. **4*c*** is a view from the other side of the tab cut assembly;

FIG. **4*d*** is a view onto the cutting surface of the assembly;

FIG. **4*e*** is a transverse section through the assembly;

FIG. 5 shows a label with a tab cut;

FIG. 6 is a block diagram of motor control circuitry;

FIG. **7*a*** is an end view of an alternative embodiment of the blade holder;

FIG. **7*b* is a view onto the cutting surface of the assembly of FIG. 7*a***;

FIG. 8 shows an end view of the tab cut assembly of FIG. **4*a*** in more detail;

FIG. 9 is a side view of two mould halves of an insert moulding assembly; and FIG. 10 shows the blade location in more detail.

DESCRIPTION OF THE PREFERRED EMBODIMENT

Figure 1:
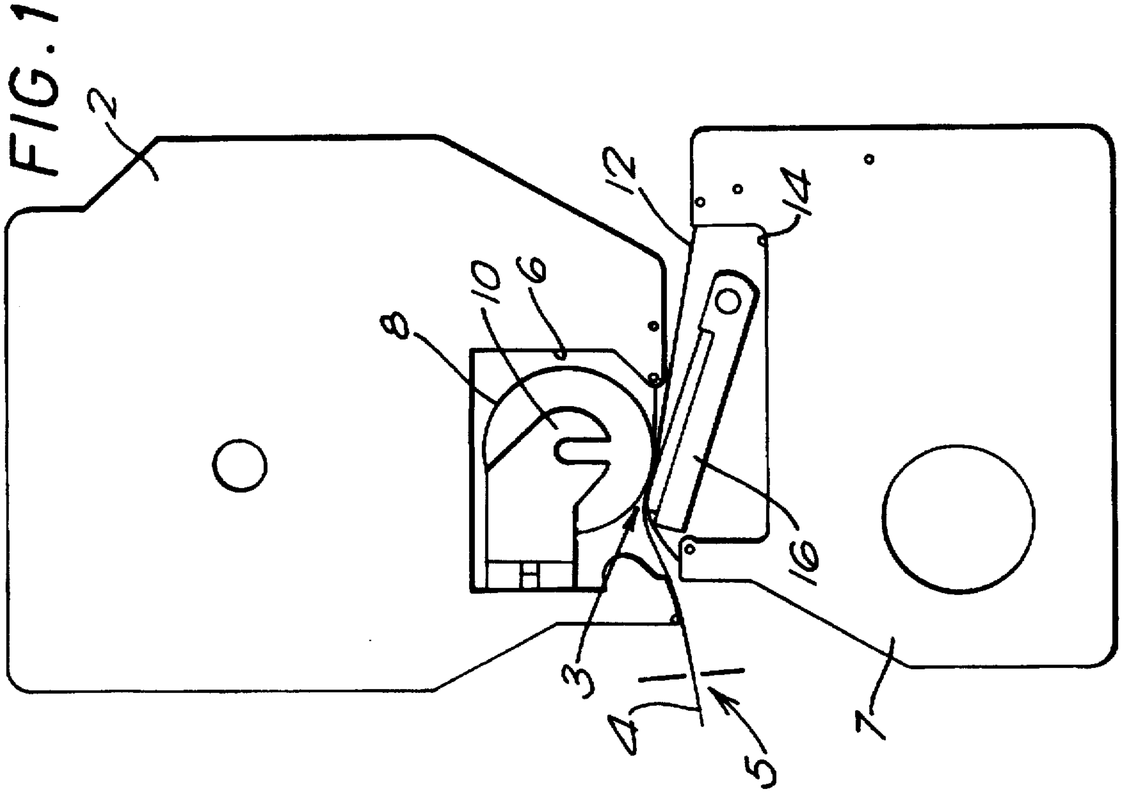
FIG. 1 is a plan view showing two cassettes inserted in a printing device.

FIG. 1 shows in plan view two cassettes arranged in a printing device. The upper cassette 2 contains a supply of image receiving tape 4 which passes through a print zone 3 of the printer to an outlet 5 of the printer. The image receiving tape 4 comprises an upper layer **4*a* for receiving a printed image on one of its surfaces and having its other surface coated with an adhesive layer to which is secured a releaseable backing layer 4*b* (see FIG. 5). The cassette 2 has a recess 6 for accommodating a platen 8 of the printer. The platen 8 is mounted for rotation within a cage moulding 10. The platen 8** could as an alternative be mounted for rotation on a pin.

The lower cassette 7 contains a thermal transfer ribbon 12 which extends from a supply spool to a take-up spool within the cassette 7. The thermal transfer ribbon 12 extends through the print zone 3 in overlap with the image receiving tape 4. The cassette 7 has a recess 14 for receiving a print head 16 of the printer. The print head 16 is movable between an operative position, shown in FIG. 1, in which it is in contact with the platen 8 and holds the thermal transfer ribbon 12 and the image receiving tape 4 in overlap between the print head and the platen and an inoperative position in which it is moved away from the platen 8 to release the thermal transfer ribbon 12 and image receiving tape 4. In the operative position, the platen is rotated to cause image receiving tape to be driven past the print head and the print head is controlled to print an image onto the image receiving tape by thermal transfer of ink from the ribbon 12. The print head is a conventional thermal print head having an array of pixels each of which can be thermally activated in accordance with the desired image to be printed.

Figure 2:
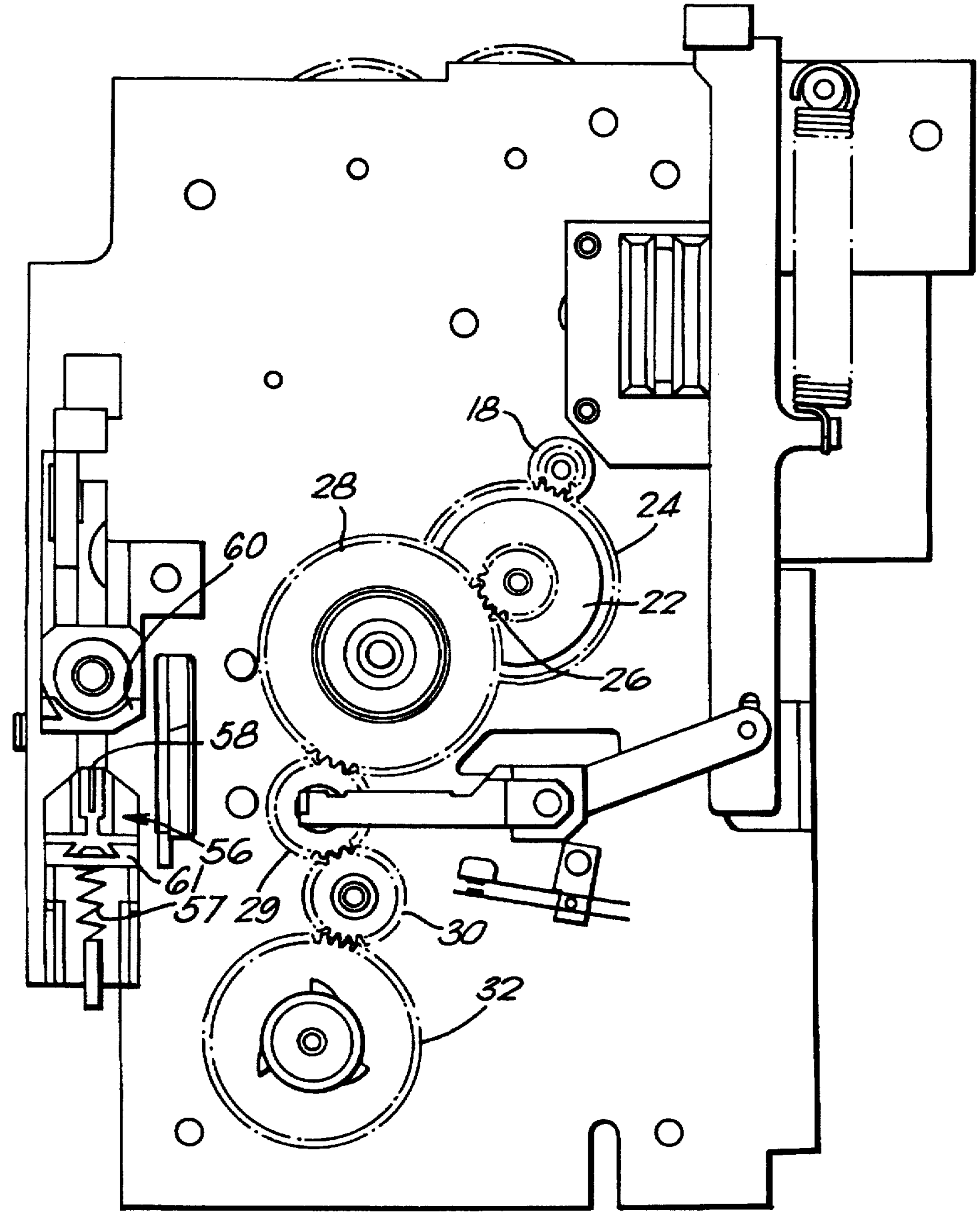
FIG. 2 is a plan view seen from the top of a cassette bay of the printing device.

FIG. 2 shows the drive train of the printing device. The printing device carries a stepper motor 18 secured to the base of the printing device by a bracket 20 (see FIG. 3). The motor drives a double radius gear 22 on its larger diameter 24 while its smaller diameter 26 drives a second gear wheel 28.

The second gear wheel 28 drives a gear 29 which causes the platen 8 to rotate and which also drives through an intermediate gear 30 a third gear 32 which drives the take-up spool for the ink ribbon in the cassette 4.

The stepper motor 18 drives the platen 8 in steps so that for each position of the platen a column of pixels is printed on the image receiving tape 4. The platen 8 drives the image receiving tape through the print zone under the action of its own rotation. The rotation of the platen and the energisation of the print head 16 are controlled by a microprocessor as described in our British Application No. 9212423.9, the contents of which are incorporated herein by reference.

FIG. 2 also shows a tab cutting assembly comprising a spring loaded blade holder designated generally by reference numeral 56 holding a blade 58 which can be forced against an anvil 60. The blade holder 56 is biased by a spring 57. In an alternative arrangement, the anvil 60 could be biased instead of the blade holder 56. The blade 58 is not designed to cut entirely through the tape but is designed to cut only through the image receiving layer **4*a* of the image receiving tape 4 and not through the releaseable backing layer 4*b***.

Figure 3:
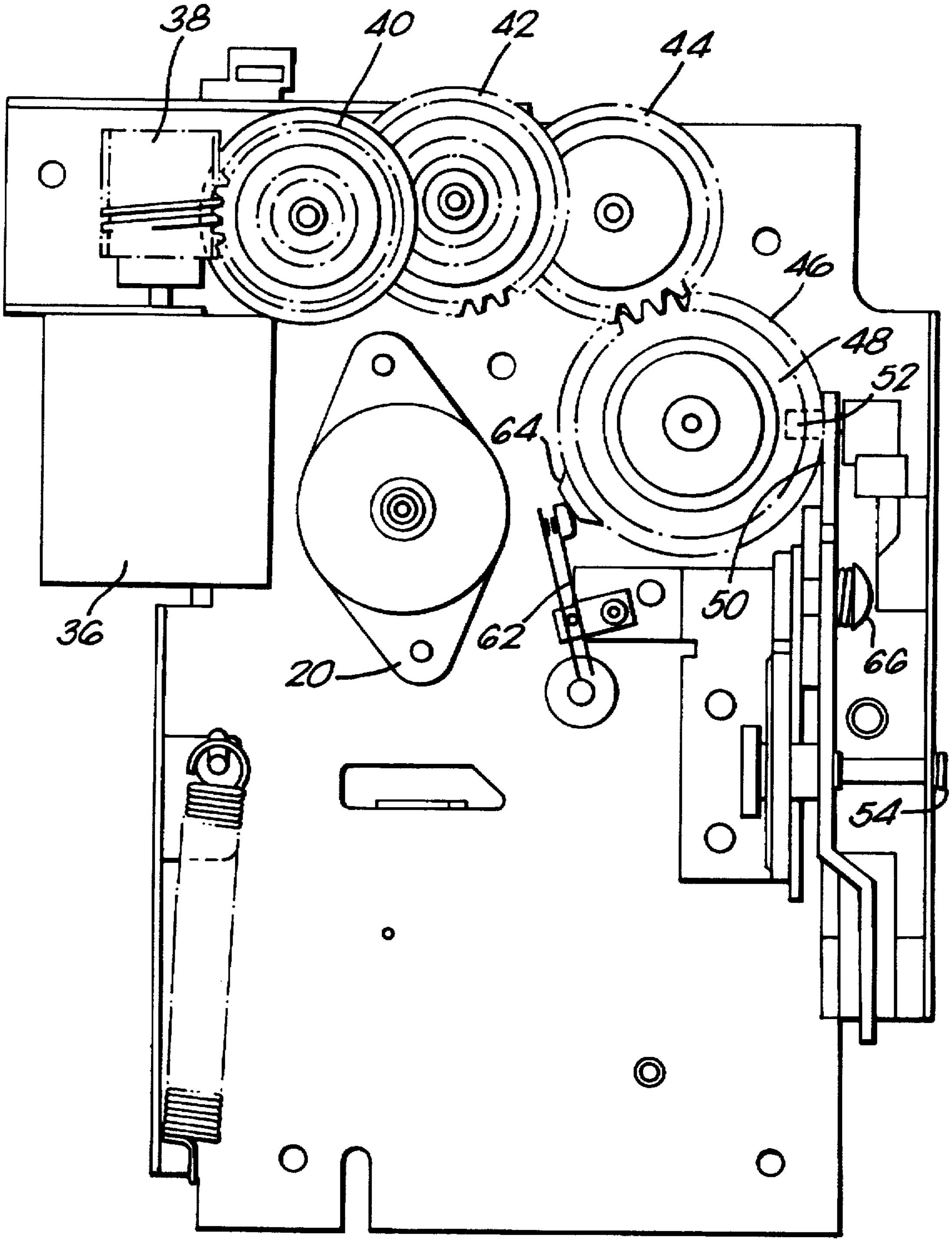
FIG. 3 is a view taken from the underneath of the bay of a printing device.

FIG. 3 is an underside view showing a cutting mechanism of the printing device. A cutter motor 36 drives a worm gear 38. This drives a gear train comprising three gears 40,42,44, the last gear 44 then driving a cam 46. The cam 46 has in its surface a cam track 48 extending circumferentially and asymmetrically. A tab cut lever arm 50 runs in the cam track 48 via a pin 52. The tab cut lever arm is pivotably mounted about a pivot point 54 and is arranged so that, as the cam rotates, it is brought into contact with the blade holder 56 to bring the blade 58 against the anvil.

When the image receiving tape 4 lies between the blade 58 and the anvil 60, the blade 58 cracks the upper polyester layer 4*a* while leaving the backing layer 4*b* intact to make a tab cut as designated by reference numeral 200 in FIG. 5. In the preferred embodiment and as described in our copending Application No. 9212423.9 a cut is simultaneously made through all of the layers of the image receiving tape to cut off a portion of tape once printed by two cooperating blades operating as scissors. The scissors can be driven by the motor 36 to cut off a portion of tape while the blade 58 makes the "tab-cut".

The cutting mechanism operates as follows. As the cam 46 rotates, the tab cut lever arm 50 is caused to move in the track 48 to bring the blade holder 56 from an inactive position spaced from the tape 4 into a cutting position where it brings the blade 58 against the anvil 60 with the tape in between. At the same time, the first scissor blade is brought into contact with the second scissor blade to perform a scissor cut. Thus, a portion of a printed tape is cut off while a tab cut 200 (see FIG. 5) is made at a short distance from the main cut.

The cutting mechanism operates with a dynamic braking system which will now be described. The cam 46 carries on its outer surface a protrusion 64. A microswitch 62 is mounted underneath the cassette receiving bay as shown in FIG. 3. FIG. 6 is a block diagram showing the main elements of the motor control circuitry. The microswitch 62 provides a signal to a microprocessor 100 for controlling the motor 36 and a brake circuit 102. The microswitch is normally open during rotation of the cam, except when the protrusion 64 is brought into contact with it, whereupon it is closed. The protrusion 64 is located so that it contacts the microswitch 62 in a position that the blade 58 is at its furthest location from the tape 4. The motor is an ordinary electric motor having a stator comprising permanent magnets which provide a magnetic field within which a wound rotor rotates. On receipt of a cut instruction, current is supplied to the rotor windings of the motor and the rotor rotates thus driving the worm gear 38, the gear train 40,42,44 and thence the cam 46. The cam 46 completes a full rotation bringing the blade 58 from its position furthest away from the tape 4 into contact with the tape to make a tab cut and then returning the blade 58 to its furthest position. In the basic implementation as described in our earlier Application, at this point the current supplied to the rotor windings of the motor is ceased. However, there is still a significant amount of inertial energy in the drive mechanism which means that the rotor of the motor continues to rotate for a short time even after current supply to the rotor windings has been cut off. This is prevented by the protrusion 64 coming into contact with the microswitch 62 with the blade 58 in its position furthest away from the tape. The microswitch passes a signal to the microprocessor 100 which responds by issuing a signal to the brake circuit 102 which acts to short circuit the terminals of the motor directly or through a low resistance thereby applying a braking torque and bringing the rotor rapidly to a standstill.

Reference is now made to FIGS. 4*a* to 4*e* to describe an accurately constructed tab cut assembly. FIG. 4*a* is a view of the tab cut assembly from one end, comprising the blade holder 56 with a blade 58. The blade holder 56 comprises an insert moulded plastics body 57 having two supporting surfaces 57*a*,57*b* which extend on either side of the blade 58. It also has a lower protrusion 59 with angled surfaces by which the holder can be resiliently mounted in a support body 61 (see FIG. 2).

FIGS. 4*b* and 4*c* are side views of the plastics body 57, showing that it has a plurality of vertical ribs 104 on each side. FIG. 4*d* is a view from above of the body 57 and FIG. 4*e* is a section taken through the body 57 and showing the ribs and the blade in more detail. The ribs provide the body 57 with additional strength. The assembly is such that the tip of the blade 58 protrudes beyond the support surfaces 57*a*,57*b* by a small but controllable amount, for example 100 to 120 microns, with a tolerance of the order of 20 μm.

FIG. 8 shows an end view of the moulded tab cut assembly in more detail.

Reference numerals 210,220 show regions into which plastic can be injected into the mould in two balanced positions such that the blade 58 is not shattered, or the cutting edge damaged during injection of the plastic.

Grooves 222,224 are provided either side of the blade 58 to ensure that adhesive build-up in use does not stop the blade 58 from cutting through the upper layer of the tape by the correct distance.

The surfaces 226,228 of the support portions 57*a*,57*b* which define the controlled cutting depth can be moulded accurately and are close enough to the blade that a flat, hard, support can be produced to allow reliable cutting to be achieved.

Features are included in the blade shape to ensure it is retained securely in the finished moulding. Furthermore, the moulded wall thicknesses are such that the component shrinks after cooling whilst maintaining the blade protrusion dimensions and tolerances.

Figure 7B:
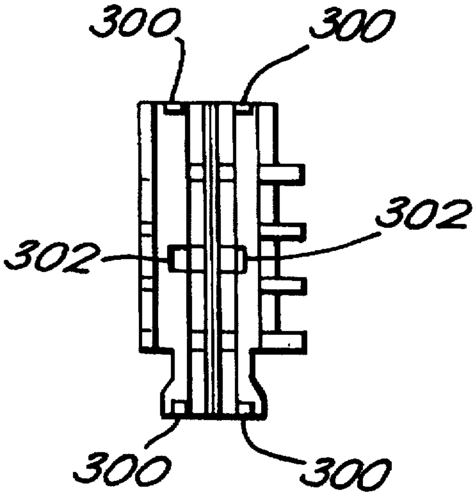

FIGS. 7*a* and 7*b* are an end view and a top view of an alternative tab cut assembly in which the surface of the holder which faces the tape in use has four "pips" or protrusions 300 which help to stop the blade 58 damaging the anvil when no tape is present and also help to prevent the blade cutting through all the layers of a narrow (6 mm) tape. The surface also has central raised portions 302 which help to overcome tolerance problems when the blade assembly is made. It is easier to control the smaller area of the raised portions 302 to overcome the problem of plastic shrinkage during moulding.

FIG. 9 is a side view showing two halves of an insert moulding assembly for manufacturing the insert moulded tab cut assembly described herein. The insert mould assembly comprises a fixed mould half 230 and a moving mould half 232. The mould halves 230,232 define, when mated, an inner mould cavity having a mould surface conforming to the desired shape of the blade holder 56. The fixed mould half 230 is provided with positioning pins 234 which serve to locate the blade 58 in a manner which will be described in more detail hereinafter with reference to FIG. 10. For a similar purpose, the moving mould half 232 is provided with spring-loaded pins 236, reference numeral 238 denoting the springs. The arrow A in FIG. 9 illustrates the direction of movement of the moving mould half 232 to the fixed mould half 230. The arrow B denotes the movement of the blade 58 towards the positioning pins, cutting side to the right in FIG. 9.

FIG. 10 shows how the blade 58 is located against the fixed mould half 230. The spring-loaded pins of the moving mould half 232 cause the blade 58 to be sprung towards the positioning pins of the fixed mould half 230, thereby accurately guiding and locating it. The positioning pins 234 include upper and lower pins 234*a*,234*b* for guiding opposed longitudinal edges of the blade 58 and intermediate positioning pins 234*c*,234*d* which are split to receive and locate the blade on opposed surfaces thereof. The fixed mould half 230 is provided with a recess 240 which has a depth d defining the protruding height of the blade 58.

The blade 58 has an aperture 242 through which plastic material flows and thus causes the blade to be held firmly in the final moulded holder. Another possibility is to provide vertical ribs which extend along opposite blade surfaces. Thus, the present invention provides a system which reliably cuts a plastic label through from the front whilst leaving the peelable release layer substantially intact.

In addition it provides a system which can cut reliably tapes of differing widths, for example 6 mm, 12 mm and 19 mm in a fully automatic cutting system. The described cutter can cut the label tape reliably from the front to a very tightly controlled depth, typically 100 microns, for a 74 micron plastic tape having a total thickness of 135 microns including adhesive and peelable release layer. Further, the cutter anvil is not damaged and the blade has a long life.

These attributes are provided in one aspect by the ceramic blade which is insert moulded into the plastic body to provide a very accurate blade protrusion distance. Insert moulding and ceramic blades are of course known per se but the special combination required to achieve the desired performance for this application are new. In particular, by selecting the correct ceramic material and grinding conditions it is possible to produce a blade which can cut through the tape with forces of less than half that required with steel blades. Further, by selecting the correct plastic material for moulding it is possible to achieve a blade protrusion tolerance of less than 20 microns. This tolerance is for example significantly less than the material shrinkage encountered during cooling after the moulded process. Also, by correct design of the moulding tool it is possible to ensure that the desired tolerances are achieved without damaging the ceramic blade, or its cutting edge, during the moulding process.

What is claimed is:

1. A method for making a blade assembly comprising:

locating a cutting blade at a predetermined position relative to a surface on a first mould part using at least one biased pin member mounted on a second mould part to urge said blade against said surface, holding the cutting blade as so urged at said predetermined position using said second mould part and said at least one biased pin member, defining a mould cavity by said first and second mould parts with a cutting portion of the blade in said predetermined position protruding from said mould cavity by an amount defined by the spacing between said first mould part surface and said cavity;

injecting a hard plastics material into the mould cavity, and allowing the plastics material to set to form an injection moulded plastics holder which extends over opposed surfaces of said blade with the cutting portion of the blade protruding from the holder to a distance which is less than the height of the holder over said opposed surfaces; and removing said injection moulded plastics holder from said mould.

2. A method as claimed in claim 1, wherein plastics material is injected into the mould at each of two locations spaced on opposed sides of the blade.

3. A method according to claim 1, wherein the amount of blade protruding from said holder is controlled to a tolerance of about 20 to 25 microns.

4. A method according to claim 1 or 2, wherein the blade is made from a ceramic material.

5. A method according to claim 1, wherein the holder has tape supporting surfaces which extend below a surface of the holder from which the blade protrudes, whereby the penetration depth of the blade into the tape is controlled during cutting.

6. A method of making a tape cutting blade assembly of the type having a holder which holds a cutting blade, and a cutting portion of the blade protruding from said holder to cut tape, said method comprising:

locating a cutting blade in a predetermined position relative to a surface on a first mould part using at least one biased pin member mounted on a second mould part to urge such blade against such surface, holding the cutting blade at said predetermined position using the second mould part and said at least one biased pin member, defining a mould by said first and second mould parts wherein a cutting portion of the blade in such predetermined position protrudes from said mould;

shaping the mould cavity to form two hard tape supporting surfaces on either side of the cutting blade for exposing a preselected amount of the cutting portion of the blade corresponding to a controlled tape-cutting depth;

injecting plastics material into the mould, and allowing the plastics material to set to form an injection moulded plastics holder which extends over opposed surfaces of said blade with an amount of the blade protruding from the holder which is less than the height of the holder over said opposed surfaces such that said holder has supporting surfaces which extend below a surface of the holder from which the cutting portion of the blade protrudes; and removing said injection moulded plastics holder from said mould.

7. A method according to claim 6 which further comprises injecting plastics material into the mould at each of two locations spaced on opposed sides of the blade.

8. A method according to claim 7 wherein the cutting portion of the blade protruding from said mould is in the range of about 100 to 120 microns.

9. A method for making a blade assembly comprising:

locating a cutting blade at a predetermined position relative to a surface on a first mould part using at least one biased pin member on a second mould part to urge said blade against said surface, holding the cutting blade so as urged at said predetermined position using said second mould part, defining a mould cavity by said first and second mould parts with a cutting portion of the blade in said predetermined position protruding from said mould cavity in the range of about 100 to 120 microns, whereby the spacing between said first mould part surface and said cavity determines such blade protrusion;

injecting plastics material into the mould cavity, and allowing the plastics material to set to form an injection moulded plastics holder which extends over opposed surfaces of said blade with an amount of the blade protruding from the holder which is less than the height of the holder over said opposed surfaces; and removing said injection moulded plastics holder from said mould.

10. A method of making a tape cutting blade assembly of the type having a holder which holds a cutting blade, and a cutting portion of the blade protruding from said holder to cut tape, said method comprising:

locating a cutting blade relative to a surface on a first mould part using at least one biased pin member on a second mould part to urge such blade against such surface, holding the cutting blade at a predetermined position using a second mould part, defining a mould by said first and second mould parts wherein a cutting portion of the blade in such predetermined position protrudes from said mould in the range of about 100 to 120 microns;

shaping the mould cavity to form two tape supporting surfaces on either side of the cutting blade;

injecting plastics material into the mould, and allowing the plastics material to set to form an injection moulded plastics holder which extends over opposed surfaces of said blade with an amount of the blade protruding from the holder which is less than the height of the holder over said opposed surfaces; and removing said injection moulded plastics holder from said mould.

11. The method of claim 1, wherein the step of locating a cutting blade further comprises moving the second mould part with the at least one biased pin member towards the first mould part.

12. The method of claim 1, wherein the step of locating a cutting blade further comprises placing the biased pin member against a blade surface disposed opposite the cutting portion.

13. The method of claim 1, wherein the entire cutting portion of the blade abuts the first mould part surface in said predetermined position.

14. The method of claim 1, wherein the step of injecting plastics material into the mould cavity is performed during the step of holding the cutting blade.

15. The method of claim 1, wherein the step of locating a cutting blade relative to a surface on a first mould part further comprises locating the cutting blade relative to positioning members extending from the first mould part adjacent said surface, and further comprises holding the cutting blade as so urged using said positioning members.

* * * * *